United States Patent [19]

Miyake

[11] Patent Number: 4,676,069
[45] Date of Patent: Jun. 30, 1987

[54] VAPOR PHASE PROCESSING APPARATUS

[76] Inventor: Eiichi Miyake, 7-D3-304, Shinsenriminamimachi 3-chome, Toyonaka-shi, Osaka, Japan

[21] Appl. No.: 846,817

[22] Filed: Apr. 1, 1986

[30] Foreign Application Priority Data

Apr. 13, 1985 [JP]  Japan .................. 60-78693

[51] Int. Cl.$^4$ ............................. F17C 13/00
[52] U.S. Cl. ............................. 62/54; 122/4 A; 219/311; 228/180.1; 228/249
[58] Field of Search ............. 62/50, 54; 122/4 A; 319/311; 228/180.1, 249

[56]  References Cited
U.S. PATENT DOCUMENTS

| Re. 30,399 | 9/1980 | Ammann et al. | 228/180.1 |
| 2,046,554 | 7/1936 | Gay | 62/54 |
| 2,387,175 | 10/1945 | Osterheld | 219/311 |
| 3,404,256 | 10/1968 | Finn | 219/311 |
| 3,561,229 | 2/1971 | Levin | 62/119 |
| 3,866,307 | 2/1975 | Pfahl, Jr. et al. | 228/249 |
| 3,904,102 | 9/1975 | Chu et al. | 228/180.1 |
| 4,389,797 | 6/1983 | Spigarelli et al. | 34/73 |

Primary Examiner—Ronald C. Capossela
Attorney, Agent, or Firm—Wenderoth, Lind & Ponack

[57]  ABSTRACT

A vapor phase processing apparatus of the type wherein an article is heated to a preselected temperature for vapor phase processing, comprises a vessel containing a liquid having a boiling point at least equal to the preselected temperature, into and out of which the article is transported, and a heating device for boiling the liquid in the vessel to produce vapor. The heating device is provided, as the sole source of heat, at a base wall of the vessel in such a manner that the heating device is not exposed to the liquid in the vessel.

3 Claims, 4 Drawing Figures

VAPOR PHASE PROCESSING APPARATUS

BACKGROUND OF THE INVENTION

1. Field of the Invention

This invention relates to an apparatus for vapor phase processing such as soldering, fusing or brazing.

An article on which the vapor phase processing is to be performed is heated to a preselected temperature appropriate for the vapor phase processing by condensing hot saturated vapor of liquid on the article. Although the present invention is not to be construed as limited to soldering, it is most readily understood in the context of soldering.

2. Description of the Prior Art

U.S. Pat. No. 3,904,102 discloses a vapor phase processing apparatus of the type wherein an article is heated to a preselected temperature for vapor phase processing comprising: a vessel containing a liquid having a boiling point at least equal to the preselected temperature, into and out of which the article is transported; heating means for boiling the liquid to produce vapor; and cooling means for condensing the vapor. In this apparatus, the heating means is provided inside the vessel. Although an external source of heat such as a hot plate may be applied to the vessel as a supplemental heating means, the main heating means remains inside the vessel. This apparatus has several disadvantages.

Since the heating means inside the vessel must be submerged in the liquid to prevent overheating, a quantity of liquid is always needed in the vessel so that the liquid level is maintained above the heating means.

Conventionally, flux is used with elements to be soldered in the soldering operation, and the flux merged in the liquid is deposited on the external surface of the heating means to degrade the thermal conductivity of the heating means.

Moreover, the existence of the heating means inside the vessel prevents easy cleaning of the interior of the vessel.

The other prior art listed below also has the above disadvantages:

U.S. Pat. No. 3,866,307;
U.S. Pat. No. 4,389,797;
U.S. Pat. No. Re. 30,399.

SUMMARY OF THE INVENTION

It is, accordingly, an object of this invention to overcome the above disadvantages of the prior art.

The above disadvantages are overcome by providing a vapor phase processing apparatus in accordance with this invention wherein heating means for boiling the liquid to produce vapor is provided, as the sole source of heat, at a base wall of the vessel in such a manner that the heating means is not exposed to the liquid in the vessel.

In this construction, since there is no heating means inside the vessel, the apparatus needs only a small quantity of liquid in the vessel during operation, and the flux merged in the liquid is prevented from being deposited on the surface of the heating means. Further, the interior of the vessel is easy to clean.

In the preferred embodiment, the heating means is provided on an outer surface of the base wall of the vessel.

The inner surface of the base wall of the vessel may be inclined with respect to the horizontal, and the heating means may include at least two heating elements disposed along the direction of the inclination of the inner surface of the base wall. The heating elements may be capable of being individually temperature-controlled by temperature controlling means associated with temperature sensor means.

In the preferred embodiment, the apparatus may include trough means for receiving condensed vapor, which is inclined in the direction opposite to the inclination of the inner surface of the base wall, and which is provided at a lowermost portion thereof with aperture means for permitting the condensed vapor received in the trough means to drop therethrough onto the uppermost portion of the inclined inner surface of the base wall.

BRIEF DESCRIPTION OF THE DRAWINGS

Other objects and advantages of this invention will be apparent from the following description in conjunction with the accompanying drawings in which.

In the drawings, like numerals designate like parts.

DETAILED DESCRIPTION OF THE PREFERRED EMBODIMENTS

Figure 1:
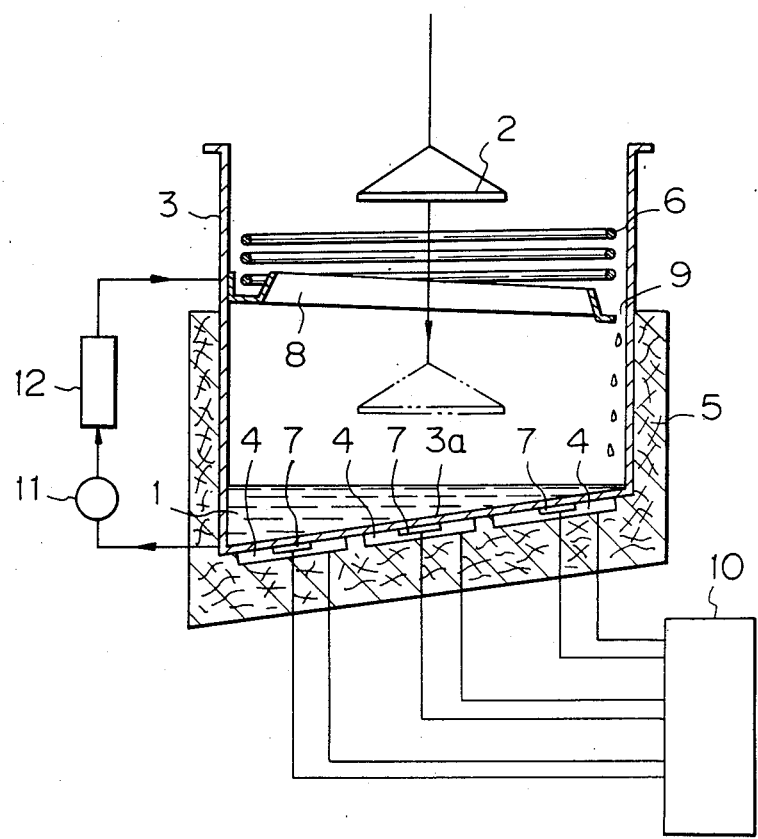
FIG. 1 shows diagrammatically a partially sectional view in elevation of one embodiment of the apparatus according to the present invention.

Referring to FIG. 1, there is shown an apparatus for performing the vapor phase processing on a single article 2 or on a batch of articles. The apparatus includes a vessel 3 having at the upper end thereof an opening through which the article 2 is transported into and out of the vessel, and a base wall 3a at the lower end thereof. The vessel 3 contains a liquid 1 having a boiling point at least equal to a temperature appropriate for the vapor phase processing. In the case of the soldering operation, the temperature may be preselected at the melting point of the solder which is placed on the article 2 with elements to be soldered thereon.

Plate-like heating elements 4 together with respective temperature sensors 7 are provided on the outer surface of the base wall 3a of the vessel 3. The inner surface of the base wall 3a is inclined in only one a single direction with respect to the horizontal as shown in FIG. 1, and the heating elements 4 and the sensors 7 are spaced from each other in the direction of the inclination of the inner surface of the base wall 3a. The heating elements 4 may be individually temperature controlled by a temperature controller 10 associated with the sensors 7.

The apparatus includes a cooling coil 6 located in the upper region of the vessel 3.

An annular trough 8 may be provided below the cooling coil 6. The trough 8 may have a rectangular configuration in general which corresponds to the shape of the cooling coil 6. The trough 8 is inclined in the direction opposite to the inclination of the inner surface of the base wall 3a of the vessel 3, and has an aperture 9 or apertures such as slits, holes, notches or the like at its lowermost portion.

The liquid 1 in the vessel 3 may be circulated through a pump 11, a filter device 12, the trough 8 and the aperture 9 for removing the flux and the other material from the liquid.

In operation, the heating elements 4 boil the liquid 1 in the vessel 3 to produce vapor. A portion of the hot saturated vapor is condensed on the article 2 transported into the vessel 3, and the article 2 is heated to the desired temperature by transfer of the heat. At this stage, the vapor phase processing (e.g., soldering, fusing or brazing) is performed on the article 2, and then the article 2 is transported out of the vessel 3.

The temperature controller 10 associated with the temperature sensors 7 individually controls the temperature of the heating elements 4 so as to effectively boil a small quantity of liquid in the vessel 3 without overheating the heating elements 4.

The condensed vapor received in the trough 8 and the filtered liquid pumped from the lower portion of the vessel 3 through the filter device 12 into the trough 8 drop through the aperture 9 onto an uppermost portion of the inner surface of the base wall 3a. When there is only a very small quantity of liquid in the vessel 3 and the upper portion of the inner surface of the base wall 3a is not submerged in the liquid 1 in the vessel 3, the drops of the liquid which have fallen from the aperture 9 onto the uppermost portion of the inner surface of the base wall 3a flow downwards thereon while being partially vaporized.

Figure 2:
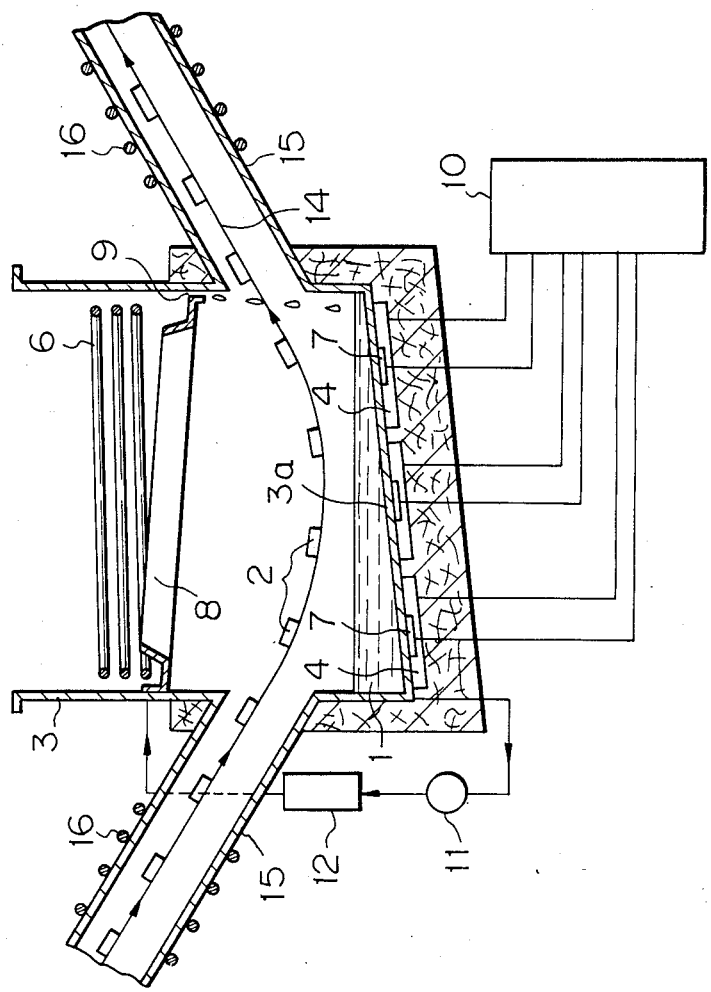
FIG. 2 shows diagrammatically a partially sectional view in elevation of another embodiment of the apparatus according to the present invention.

The embodiment shown in FIG. 2 is combined with a continuous conveyor system. In this embodiment, the articles 2 are continuously transported into and out of the vessel 3 by a belt conveyor system 14 through conduits 15 provided on the opposed side walls of the vessel 3. The conduits 15 are provided with cooling coils 16. The construction and the operation of the other parts are similar to those of the embodiment in FIG. 1.

Figure 3:
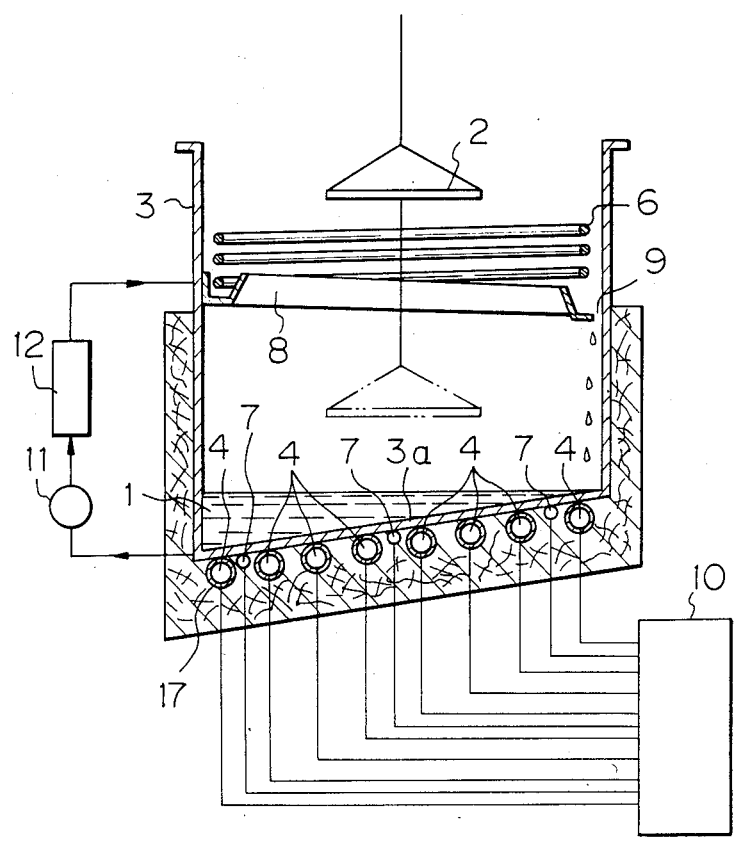
FIG. 3 shows diagrammatically a partially sectional view in elevation of still another embodiment of the apparatus according to the present invention.
Figure 4:
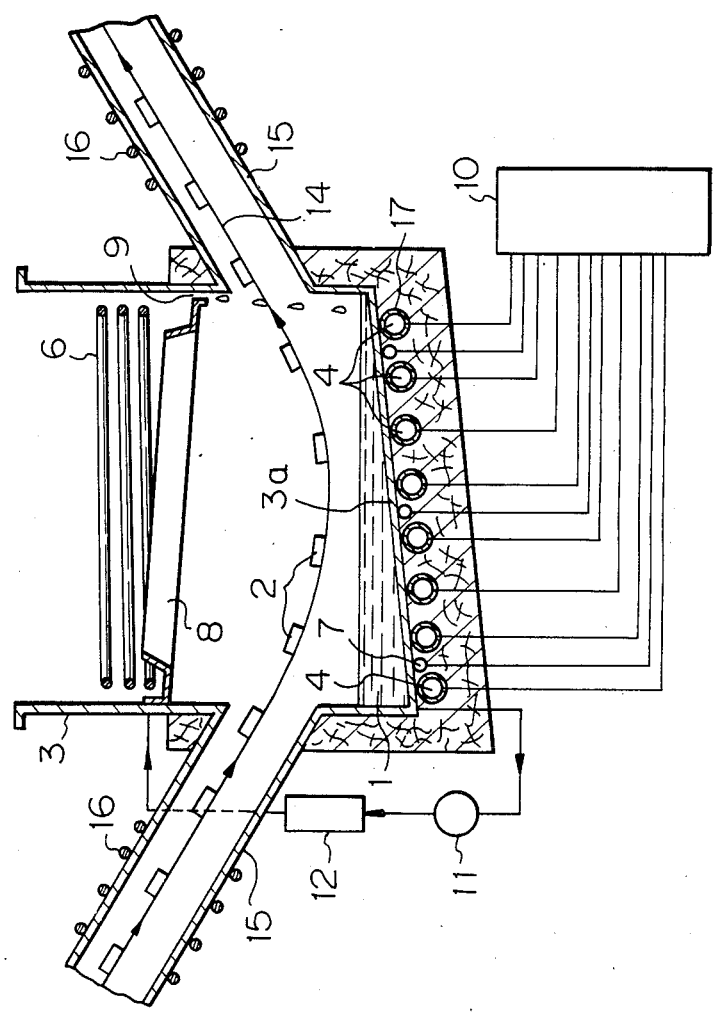
FIG. 4 shows diagrammatically a partially sectional view in elevation of still another embodiment of the apparatus according to the present invention.

The embodiments shown in FIGS. 3 and 4 are similar to the embodiments shown in FIGS. 1 and 2, respectively, but are different from them in that the heating elements 4 are in a cylindrical form and are located in pipes 17 which are secured on the outer surface of the base wall 3a by means of, for example, welding. The heating elements 4 may be removable from the respective pipes 17 for maintenance purposes.

The construction and the operation of the other parts of the embodiments in FIGS. 3 and 4 are similar to those of the embodiments shown in FIGS. 1 and 2, respectively.

I claim:

1. A vapor phase processing apparatus of the type wherein an article is heated to a preselected temperature for vapor phase processing, said apparatus comprising:

a vessel containing a liquid having a boiling point at least equal to said preselected temperature, into and out of which the article is transported, said vessel having a base wall having an inner surface inclined in only one direction with respect to the horizontal and sidewalls extending upward from the periphery of said inner surface;

heating means for boiling said liquid to produce vapor, which is provided, as the sole source of heat, at said base wall of the vessel so as not to be exposed to said liquid in the vessel, said heating means including at least two side-by-side heating elements spaced apart in said only one direction on an outer surface of said base wall below said inner surface; and cooling means for condensing said vapor.

2. The apparatus of claim 1, further comprising temperature sensing means and temperature controlling means associated with said temperature sensor means, for individually controlling said heating elements.

3. The apparatus of claim 1 wherein the apparatus includes trough means for receiving condensed vapor, which is inclined in the direction opposite to the direction of inclination of said inner surface of the base wall and which is provided at a lowermost portion thereof with aperture means for permitting the condensed vapor received in the trough means to drop therethrough onto the uppermost portion of said inner surface of the base wall.

* * * * *